(12) United States Patent
Hayashi

(10) Patent No.: US 7,980,700 B2
(45) Date of Patent: Jul. 19, 2011

(54) ELECTRONIC APPARATUS HOUSING COVER, ELECTRONIC APPARATUS, AND PROJECTOR

(75) Inventor: Naoki Hayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 286 days.

(21) Appl. No.: 12/339,711

(22) Filed: Dec. 19, 2008

(65) Prior Publication Data

US 2009/0168024 A1 Jul. 2, 2009

(30) Foreign Application Priority Data

Dec. 27, 2007 (JP) ................................. 2007-335955

(51) Int. Cl.
*G03B 31/00* (2006.01)
*G03B 31/06* (2006.01)

(52) U.S. Cl. ........................... 353/15; 353/119; 381/338

(58) Field of Classification Search .................... 353/15, 353/101, 149, 119; 381/338, 386, 397, 398
See application file for complete search history.

(56) References Cited

U.S. PATENT DOCUMENTS

| | | | | |
|---|---|---|---|---|
| 6,078,676 A | * | 6/2000 | Takenaka | 381/338 |
| 6,259,798 B1 | * | 7/2001 | Perkins et al. | 381/397 |
| 7,494,229 B2 | * | 2/2009 | Miyasaka | 353/101 |

FOREIGN PATENT DOCUMENTS

| | | | |
|---|---|---|---|
| JP | A 5-191758 | | 7/1993 |
| JP | A-05-297459 | | 11/1993 |
| JP | A 11-225388 | | 8/1999 |
| JP | 0200422918 | * | 1/2003 |
| JP | A-2004-207400 | | 7/2004 |
| JP | A-2004-264608 | | 9/2004 |
| JP | A-2006-047555 | | 2/2006 |
| JP | A 2007-52320 | | 3/2007 |

* cited by examiner

*Primary Examiner* — Georgia Y Epps
*Assistant Examiner* — Don Williams
(74) *Attorney, Agent, or Firm* — Oliff & Berridge PLC

(57) ABSTRACT

An electronic apparatus housing cover is adapted to be attached to a housing of an electronic apparatus having a connection terminal to be connected to an external apparatus via a connecting cable, and a speaker device adapted to output a sound, and cover the connection terminal and the speaker device. The housing cover includes a cover main body having a box like shape, having an opening on a face opposed to the housing, and having an insertion passage section through which the connecting cable is inserted, and an acoustic effect section provided to the cover main body, and adapted to execute an acoustic effect processing on a sound output from the speaker device.

7 Claims, 13 Drawing Sheets

ELECTRONIC APPARATUS HOUSING COVER, ELECTRONIC APPARATUS, AND PROJECTOR

BACKGROUND

1. Technical Field

The present invention relates to an electronic apparatus housing cover, an electronic apparatus, and a projector equipped with an electronic apparatus housing cover.

2. Related Art

In the past, in a field of an electronic apparatus (e.g., a projector), there is proposed an electronic apparatus housing cover adapted to cover a rear face side of the electronic apparatus housing in an untidy state with connecting cables coupled to a group of connection terminals and so on to protect the connection terminals, and further improve the appearance of the electronic apparatus housing itself (see JP-A-2004-207400).

However, in projectors, for example, there is sometimes disposed a speaker device in addition to the connection terminals on the rear face of the housing. In the case in which the electronic apparatus housing cover is attached to the rear face of the housing of such a projector, the speaker device is covered by the cover, and there arises a problem that the sound pressure of the sound output from the speaker device is lowered, or the sound quality thereof is degraded. Therefore, there have been demands for an electronic apparatus housing cover capable of suppressing drop of sound pressure and degradation in sound quality when attached to an electronic apparatus equipped with a speaker device.

SUMMARY

The invention has an advantage of solving at least a part of the problem described above, and can be realized as the following embodiments or aspects.

An electronic apparatus housing cover according to a first aspect of the invention is an electronic apparatus housing cover adapted to be attached to a housing of an electronic apparatus having a connection terminal to be connected to an external apparatus via a connecting cable, and a speaker device adapted to output a sound, and cover the connection terminal and the speaker device including a cover main body having a box like shape, having an opening on a face opposed to the housing, and having an insertion passage section through which the connecting cable is inserted, and an acoustic effect section provided to the cover main body, and adapted to execute an acoustic effect processing on a sound output from the speaker device.

According to the electronic apparatus housing cover, the acoustic effect section provided to the cover main body executes the acoustic effect processing on the sound output from the speaker device. Thus, when attaching the electronic apparatus housing cover to the housing of the electronic apparatus, it becomes possible to protect the connection terminal, and at the same time, to suppress lowering of the sound pressure and degradation in the sound quality of the sound, which is output by the speaker device, with the acoustic effect processing.

In the electronic apparatus housing cover according to a second aspect of the invention, in addition to the electronic apparatus housing cover described above, it is preferable that the acoustic effect section is provided with a front loaded horn.

According to such an electronic apparatus housing cover, the front loaded horn is provided to the acoustic effect section. Thus, when attaching the electronic apparatus housing cover to the electronic apparatus housing, it becomes possible to reinforce the middle and high-frequency band of the sound output by the speaker device. Here, the front loaded horn denotes a horn attached to the front face of the speaker device.

In the electronic apparatus housing cover according to a third aspect of the invention, in addition to the electronic apparatus housing cover described above, it is preferable that the acoustic effect section forms a Kelton type enclosure having a port.

According to such an electronic apparatus housing cover, the acoustic effect section forms the Kelton type enclosure having a port. Thus, when attaching the electronic apparatus housing cover to the electronic apparatus housing, it becomes possible to reinforce the low-frequency band of the sound output by the speaker device. Here, the Kelton type enclosure having a port denotes an enclosure having a box provided with a port and formed on the front face of the speaker device.

In the electronic apparatus housing cover according to a fourth aspect of the invention, in addition to the electronic apparatus housing cover described above, it is preferable that the acoustic effect section forms a Kelton type enclosure having a passive radiator.

According to such an electronic apparatus housing cover, the acoustic effect section forms the Kelton type enclosure having a passive radiator. Thus, when attaching the electronic apparatus housing cover to the electronic apparatus housing, it becomes possible to reinforce the low-frequency band of the sound output by the speaker device. Here, the passive radiator denotes a diaphragm (drawn cone) without a drive system.

An electronic apparatus according to a fifth aspect of the invention includes an electronic apparatus main body covered by a housing, and the electronic apparatus housing cover according to any one of the above aspects of the invention.

According to such an electronic apparatus, since the electronic apparatus is equipped with the electronic apparatus housing cover described above, the same advantages as described above can be obtained.

A projector according to a sixth aspect of the invention includes a light source, a light modulation device adapted to modulate light emitted from the light source to form an optical image, a projection optical system adapted to project the optical image formed by the light modulation device, a housing adapted to house the light source, the light modulation device, and the light projection optical system, and the electronic apparatus housing cover according to any one of the above aspects of the invention.

According to such a projector, since the projector is equipped with the electronic apparatus housing cover described above, the same advantages as described above can be obtained.

BRIEF DESCRIPTION OF THE DRAWINGS

The invention will now be described with reference to the accompanying drawings, wherein like numbers reference like elements.

FIGS. 5A and 5B are cross-sectional diagrams of the projector housing with the projector housing cover attached thereto, wherein FIG. 5A is the cross-sectional diagram viewed from the upper side thereof, and FIG. 5B is the cross-sectional diagram viewed from a lateral side thereof.

FIGS. 9A and 9B are cross-sectional diagrams of the projector with the projector housing cover attached thereto, wherein FIG. 9A is the cross-sectional diagram viewed from the upper side thereof, and FIG. 9B is the cross-sectional diagram viewed from a lateral side thereof.

FIGS. 12A and 12B are cross-sectional diagrams of the projector with the projector housing cover attached thereto, wherein FIG. 12A is the cross-sectional diagram viewed from the upper side thereof, and FIG. 12B is the cross-sectional diagram viewed from a lateral side thereof.

FIGS. 13A and 13B are cross-sectional diagrams of the projector with the projector housing cover according to a modified example attached thereto, wherein FIG. 13A is the cross-sectional diagram viewed from the upper side thereof, and FIG. 13B is the cross-sectional diagram viewed from a lateral side thereof.

DESCRIPTION OF EXEMPLARY EMBODIMENTS

Hereinafter, as embodiments of an electronic apparatus and an electronic apparatus housing cover, a projector adapted to project an image based on an image signal input thereto to display the image on an external screen, and some projector housing covers will be explained.

First Embodiment

Figure 1:
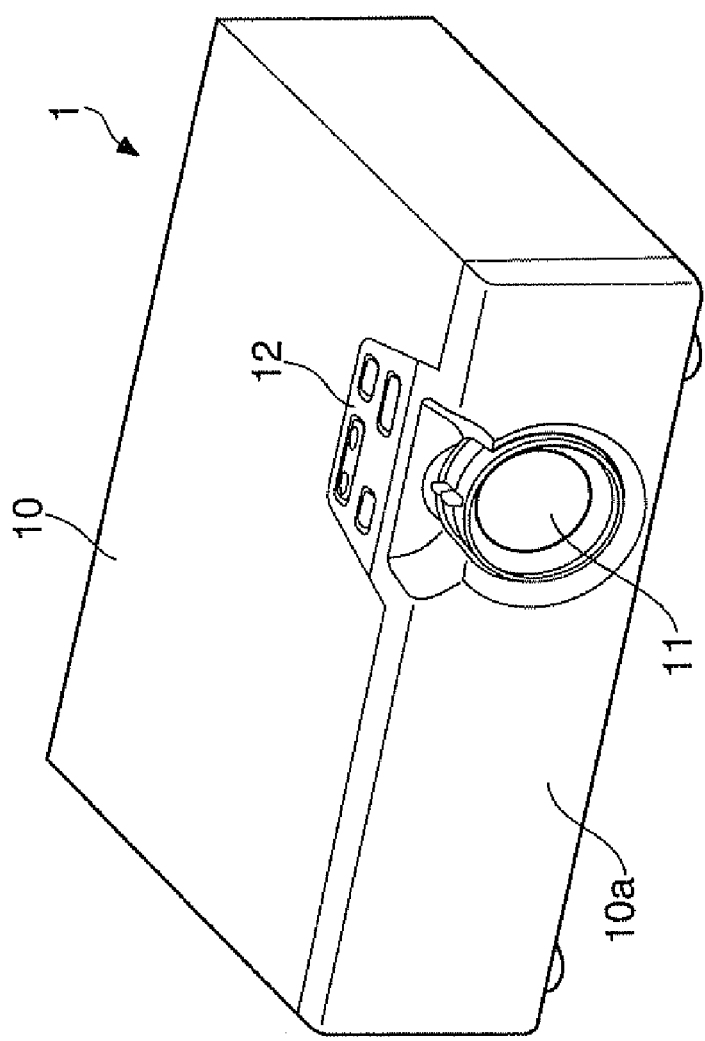
FIG. 1 is a perspective view of a projector according to a first embodiment, viewed from the front side thereof.

FIG. 1 is a perspective view of a projector according to a first embodiment, viewed from the front side thereof. As shown in FIG. 1, the projector 1 has a configuration in which the main body of the projector 1 is covered by a housing 10, and a front face 10a of the housing 10 is provided with a projection lens 11 as a projection optical system. Further, on the top face of the housing 10, there is disposed an input operation section 12.

Figure 2:
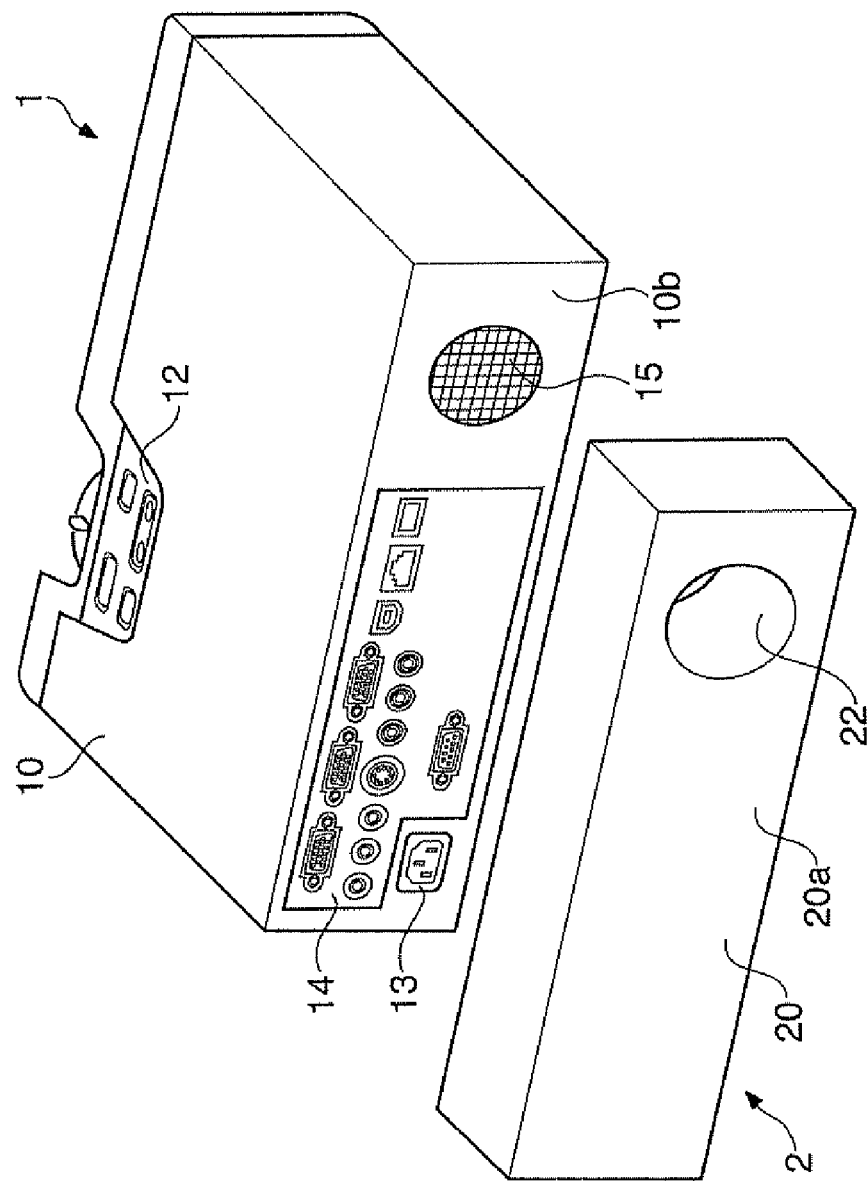
FIG. 2 is a perspective view of the projector and a projector housing cover viewed form the rear side thereof.

FIG. 2 is a perspective view of the projector and the projector housing cover viewed form the rear side thereof.

Figure 3:
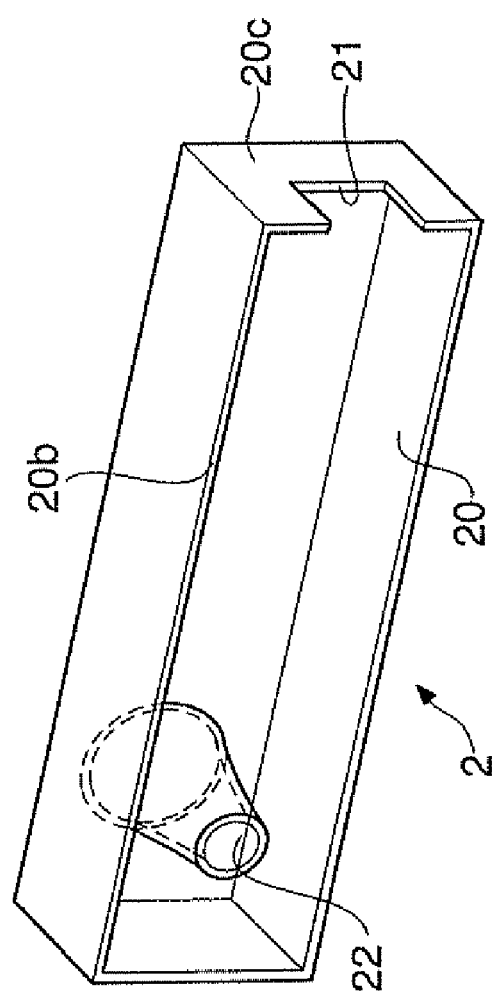
FIG. 3 is a perspective view of the projector housing cover viewed from the front side thereof.

FIG. 3 is a perspective view of the projector housing cover viewed from the front side thereof.

In FIG. 2, the projector housing cover 2 is disposed at a position opposed to the rear face 10b of the housing 10 of the projector 1.

As shown in FIG. 2, the projector 1 is provided with a power supply terminal 13, a connection terminal group 14, a sound emission opening 15 on the rear face 10b of the housing 10.

The power supply terminal 13 is coupled to a power supply cable (not show), thereby supplying the projector 1 with the commercial power supply of, for example, 100V AC from the outside.

The connection terminal group 14 is provided with a plurality of connection terminals to be connected to external devices via connecting cables. As the connection terminals, there are cited a computer image input terminal, a computer sound input terminal, a video image input terminal, a video sound input terminal, a local area network (LAN) terminal, a Universal Serial Bus (USB) terminal, and so on.

The sound emission opening 15 is an output section of the sound from a speaker device. The sound emission opening 15 can be formed as a plurality of sound emission holes provided to the housing 10, or formed of a saran-net or the like.

As shown in FIGS. 2 and 3, the projector housing cover 2 is provided with a cover main body 20 with a box like shape having an opening on the side (the front face 20b) opposed to the housing 10 of the projector 1, and a front loaded horn 22 as an acoustic effect section. The cover main body 20 is made of synthetic resin or the like, and forms an outer wall of the projector housing cover 2. Further, the cover main body 20 is provided with an insertion passage section 21. It should be noted that the cover main body 20 is not limited to be made of synthetic resin, The insertion passage section 21 is a notch section formed by cutting a side face 20c of the cover main body 20 so as to have a substantially rectangular shaper and when the cover main body 20 is attached to the housing 10 of the projector 1, the insertion passage section 21 forms an opening section with a substantially rectangular shape surrounded by the cover main body 20 and the housing 10. Further, the connecting cables to be coupled to the connection terminal group 14 are inserted through the opening section (the insertion passage section 21).

The front loaded horn 22 is a horn with a cylindrical shape integrally formed of substantially the same synthetic resin or the like as that of the cover main body 20, and is disposed so as to protrude from the rear face 20a of the cover main body 20 towards the front face 20b side. The front loaded horn 22 is disposed at a position facing the sound emission opening 15 of the projector 1, and has a shape having the opening area thereof at a position between the front face 20b and the rear face 20a of the cover main body 20 gradually increasing as the position moves from the front face 20b towards the rear face 20a. It should be noted that in the present embodiment although the front loaded horn 22 is assumed to be made of substantially the same synthetic resin or the like, the material is not limited thereto.

Figure 4:
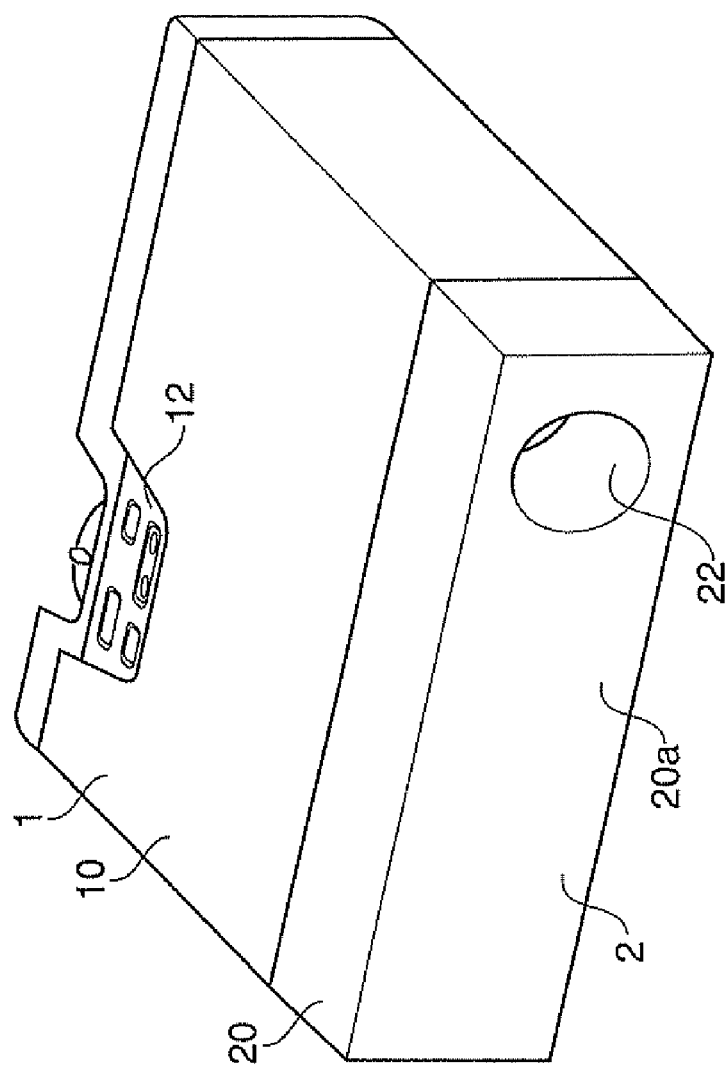
FIG. 4 is a perspective view of the projector housing with the projector housing cover attached thereto.

FIG. 4 is a perspective view of the projector housing with the projector housing cover attached thereto.

As shown in FIG. 4, when the projector housing cover 2 is attached to the housing 10 of the projector 1, the end section of the front loaded horn 22 on the front side thereof has contact with the sound emission opening 15 shown in FIG. 2, and the sound output from the speaker device is output to the outside via the front loaded horn 22. It should be noted that in the present embodiment, the cover main body 20 and the housing 10 of the projector 1 are fixed to each other with screws or the like not shown in the drawings.

Figure 5A:
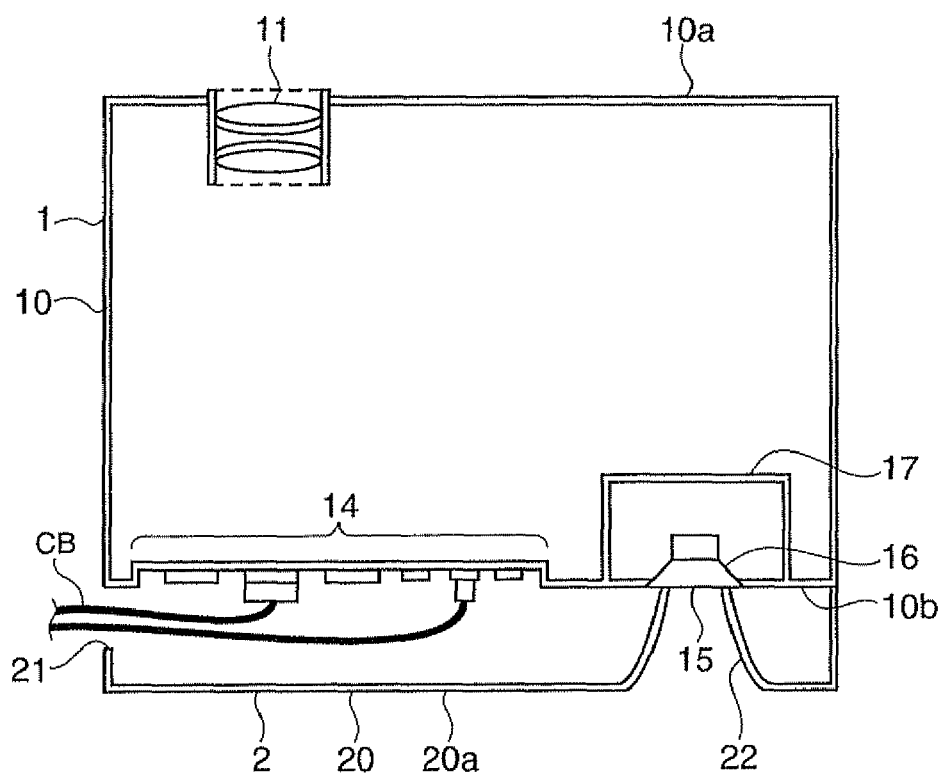
Figure 5B:
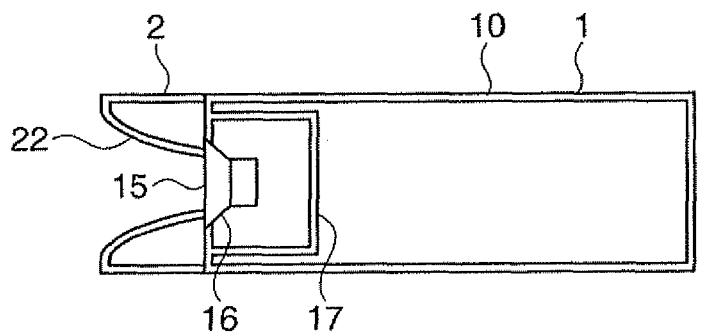

FIGS. 5A and 5B are cross-sectional diagrams of the projector housing with the projector housing cover attached thereto. FIG. 5A is the cross-sectional diagram thereof viewed from the upper side, and FIG. 5B is the cross-sectional diagram thereof viewed from a lateral side.

As shown in FIGS. 5A and 5B, the projector 1 is provided with a speaker device 16. The speaker device 16 is disposed so that the front section (the diaphragm side) thereof faces the inside surface of the rear face 10a of the housing 10. Further, the housing 10 where the diaphragm of the speaker device 16 faces is provided with the sound emission opening 15. Further, the projector 1 is provided with a rear enclosure 17 so as to surround the rear of the speaker device 16 in a box-like form.

To the connection terminal group 14 of the projector 1, there is coupled an end of the connecting cable CB. The connecting cable CB is led out to the outside of the cover main body 20 via the insertion passage section 21, and the other end of the connecting cable CB is coupled to an external apparatus (not shown) such as a personal computer or a video reproducing device.

Then, a functional configuration of the projector 1 according to the present embodiment will hereinafter be described.

Figure 6:
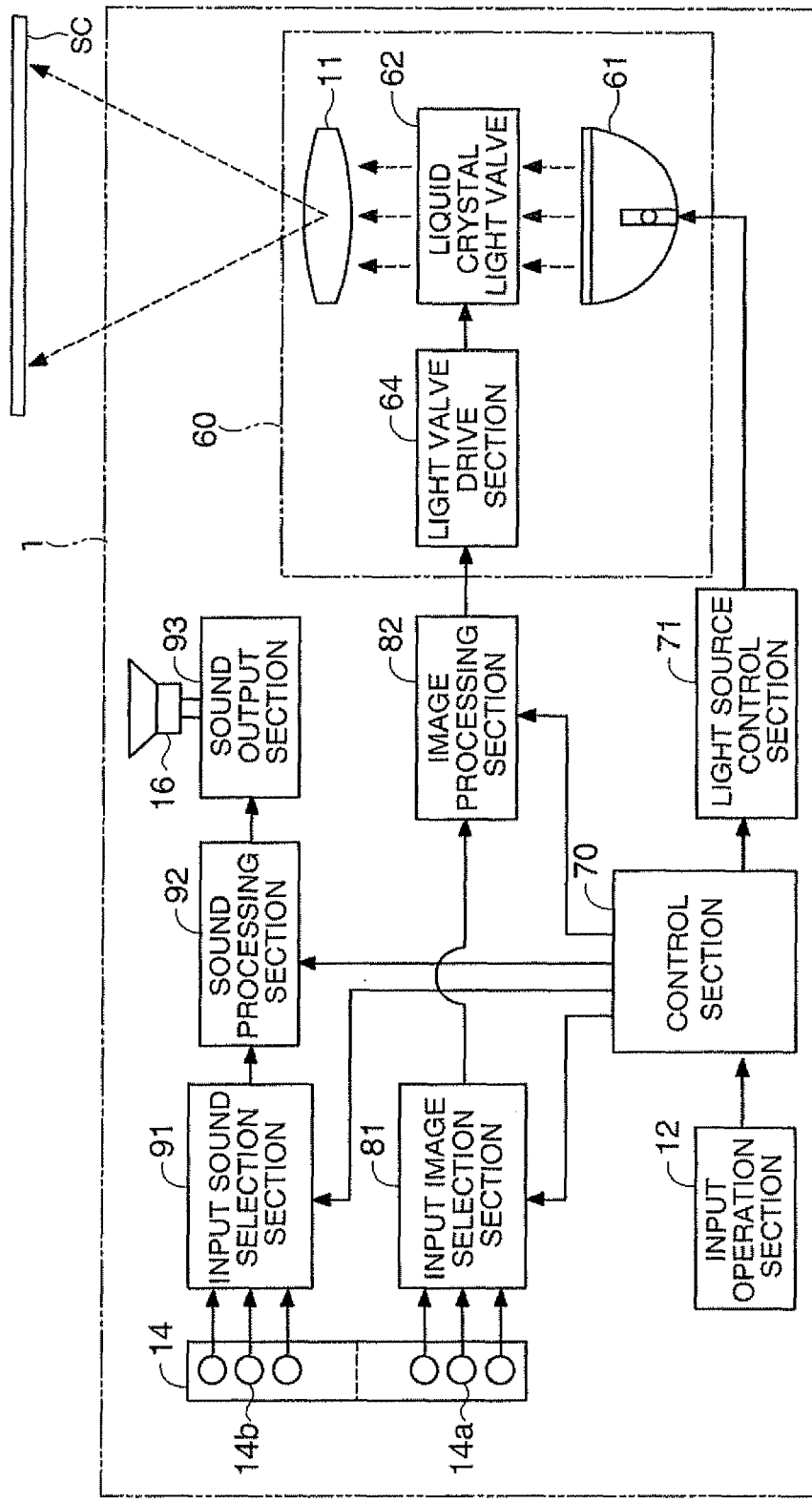
FIG. 6 is a block diagram showing a schematic configuration of the projector.

FIG. 6 is a block diagram showing a schematic configuration of a projector according to the present embodiment.

The projector 1 is provided with an image projection section 60, a control section 70, the input operation section 12, a light source control section 71, the connection terminal group 14, an input image selection section 81, an image processing section 82, an input sound selection section 91, a sound processing section 92, a sound output section 93, the speaker device 16, and so on. Further, FIG. 6 shows a screen SC outside the projector 1.

The image projection section 60 is provided with a light source 61 formed of a discharge light source such as a super-high pressure mercury lamp or a metal halide lamp, or of a solid-state light source such as a light emitting diode (LED), a liquid crystal light valve 62 as a light modulation device, a projection lens 11 as the projection optical system, and a light valve drive section 64 for driving the liquid crystal light valve 62.

The liquid crystal light valve 62 is composed mainly of a transmissive liquid crystal panel having a liquid crystal material encapsulated between a pair of transparent substrates. When the light valve drive section 64 drives each pixel of the liquid crystal light valve 62 by applying a drive voltage, which corresponds to the image signal, to the pixel, the pixel transmits the source light with the transmission corresponding to the image signal.

The light emitted from the light source 61 is modulated while transmitted through the liquid light valve 62, and the projection lens 11 projects the light thus modulated, thereby displaying the image corresponding to the image signal on the screen SC and so on.

The control section 70 is provided with a central processing unit (CPU), a random access memory (RAM) used as a temporary storage for various data, a nonvolatile memory such as a mask read only memory (ROM), a flash memory, or a ferroelectric RAM (FeRAM), and so on (neither of them is shown), and functions as a computer. The CPU operates along a control program stored in the nonvolatile memory, thus the control section 70 integrally controls the operation of the projector 1.

The input operation section 12 is provided with, for example, a plurality of operation keys for providing various instructions to the projector 1. As the keys provided to the input operation section 12, there are cited "a power key" for switching ON/OFF the power, "an input source switching key" for switching the input image and input sound, "a menu key" for switching display/nondisplay of a menu screen for performing various settings, "a cursor key" used, for example, for moving the cursor in the menu screen, and "a determination key" for determining the various settings. When the user operates the input operation section 12, the input operation section 12 outputs an operation signal corresponding to the operation by the user to the control section 70. It should be noted that the input operation section 12 can be arranged to have a configuration of including a remote control signal receiving section (not shown) and a remote controller (not shown) capable of performing remote control. In this case, the remote controller emits an operation signal on, for example, an infrared ray corresponding to the content of the operation by the user, thus the remote control signal receiving section receives the operation signal and transmits it to the control section 70.

The light source section 71 controls supply and stop of the power to the light source 61 based on the instruction from the control section 70, thus switching lighting and extinction of the light source 61.

The connection terminal group 14 is provided with a plurality of connection terminals 14a capable of inputting various types of image signals from an external apparatus (not shown) such as a personal computers or video reproducing device. The image signal input to each of the connection terminals 14a is supplied to the input image selection section 81. Further, the connection terminal group 14 is also provided with a plurality of connection terminals 14b capable of inputting various types of sound signals from the external apparatus. The sound signal input to each of the connection terminals 14b is supplied to the input sound selection section 91.

The input image selection section 81 selects one of the connection terminals 14a corresponding to the instruction from the control section 70 among the plurality of connection terminals 14a, and outputs the image signal, which is input to the selected connection terminal 14a, to the image processing section 82. When the user designates a desired one of the connection terminals 14a by operating the input source switching key provided to the input operation section 12, the control section 70 provides an instruction to the input image selection section 81 to output the image signal, which is input to the designated connection terminal 14a, to the image processing section 82.

The image processing section 82 converts the image signal of the various types, which is input from the input image selection section 81, into the image data represents the gray scale of each pixel of the liquid crystal light valve 62, namely the image data for defining the drive voltage to be applied to each pixel. Further, the image processing section 82 executes processing for adjusting brightness, contrast, sharpness, and color on the image data thus converted, following the instruction by the control section 70. The image data on which image quality adjustment is executed by the image processing section 82 is output to the light valve drive section 64.

The input sound selection section 91 selects one of the connection terminals 14b corresponding to the instruction from the control section 70 among the plurality of connection terminals 14b, and outputs the sound signal, which is input to the selected connection terminal 14b, to the sound processing section 92. When the user designates a desired one of the connection terminals 14b by operating the input source switching key provided to the input operation section 12, the control section 70 provides an instruction to the input sound selection section 91 to output the sound signal, which is input to the designated connection terminal 14b, to the sound processing section 92. It should be noted that it is possible to arrange that the input sound selection section 91 selects the connection terminal 14b in conjunction with the connection terminal 14a selected by the input image selection section 81.

The sound processing section 92 executes a processing for adjusting the output characteristic thereof on the sound signal input from the input sound selection section 91, following the instruction by the control section 70. The sound signal on which the adjustment processing is executed by the sound processing section 92 is output to the sound output section 93.

The sound output section 93 is provided with an amplifying circuit and so on (not shown), and outputs the sound, which is based on the sound signal input from the sound processing section 92, from the speaker device 16.

The operation of the projector 1 according to the present embodiment will hereinafter be explained.

When the commercial power supply of 100V AC is supplied externally to the projector 1, the power supply circuit (not shown) supplies the control section 70, the input operation section 12, and so on with power (standby power). The control section 70, in response to the power supply, starts the operation along the control program. In the period immediately after the commercial power supply is supplied, the projector 1 is in a standby state, and in this state, the control section 70 monitors the operation (the ON operation) to the power key of the input operation section 12. Further, when the ON operation is detected, the control section 70 provides the power supply circuit with an instruction to start supplying the main power necessary for projecting an image and so on to switch the projector 1 to the ON state, and at the same time, executes the necessary initial operations such as putting on the light source 61. As a result, the image corresponding to the image signal input to the projector 1 is projected from the image projection section 60, and the sound corresponding to the sound signal, which has been input to the projector 1, is output from the speaker device 16.

In the configuration described above, when the projector housing cover 2 is attached to the projector 1, and the sound signal is input to the connection terminal 14b from the external device such as a personal computer or a video reproducing device, the speaker device 16 of the projector 1 outputs the sound based on the sound signal, and the sound is output to the outside via the front loaded horn 22.

According to the embodiment described above, the following advantages can be obtained.

1. The projector housing cover 2 is provided with the front loaded horn 22 as the acoustic effect section. Thus, when the projector housing cover 2 is attached to the housing 10 of the projector 1, it becomes possible to reinforce the middle-frequency band and the high-frequency band of the sound output by the speaker device 16 as the acoustic effect processing. Therefore, lowering of the sound pressure and degradation in sound quality of the sound can be suppressed in comparison with the case of attaching a projector housing cover without the horn provided thereto. Further, by reinforcing the middle-frequency band and the high-frequency band of the sound, sentences spoken by a character becomes easy to catch. Further, since the front loaded horn 22 described above is effective for middle and high range speakers, and is suitable for projectors equipped with the middle or high range speaker.

2. In the case of attaching the projector housing cover 2 to the housing 10 of the projector 1, it becomes possible for the front loaded horn 22 to improve the efficiency, thereby making the sound output therefrom reach longer in comparison with the case of using the projector 1 alone. Further, it is possible to improve the acoustic directional characteristics.

3. Since the front loaded horn 22 is formed integrally with the cover main body 20, and therefore it becomes possible to suppress lowering of the sound pressure and degradation in the sound quality without requiring any additional members, and without increasing the number of components.

4. The front loaded horn 22 is formed integrally with the cover main body 20 of the projector housing cover 2, and therefore, does not disfigure the projector housing cover 2. In other words, in the case of attaching the projector housing cover 2 to the projector 1, the projector 1 is not disfigured as a whole.

Second Embodiment

Hereinafter, a second embodiment will be explained.

The projector housing cover according to the present embodiment is provided with a partition plate and a port forming a Kelton type enclosure with a port, instead of the front loaded horn 22 of the projector housing cover 2 according to the first embodiment. The other constituents are the same as those of the first embodiment.

The projector housing cover will be explained with reference to FIGS. 7, 8, 9A, and 9B.

Figure 7:
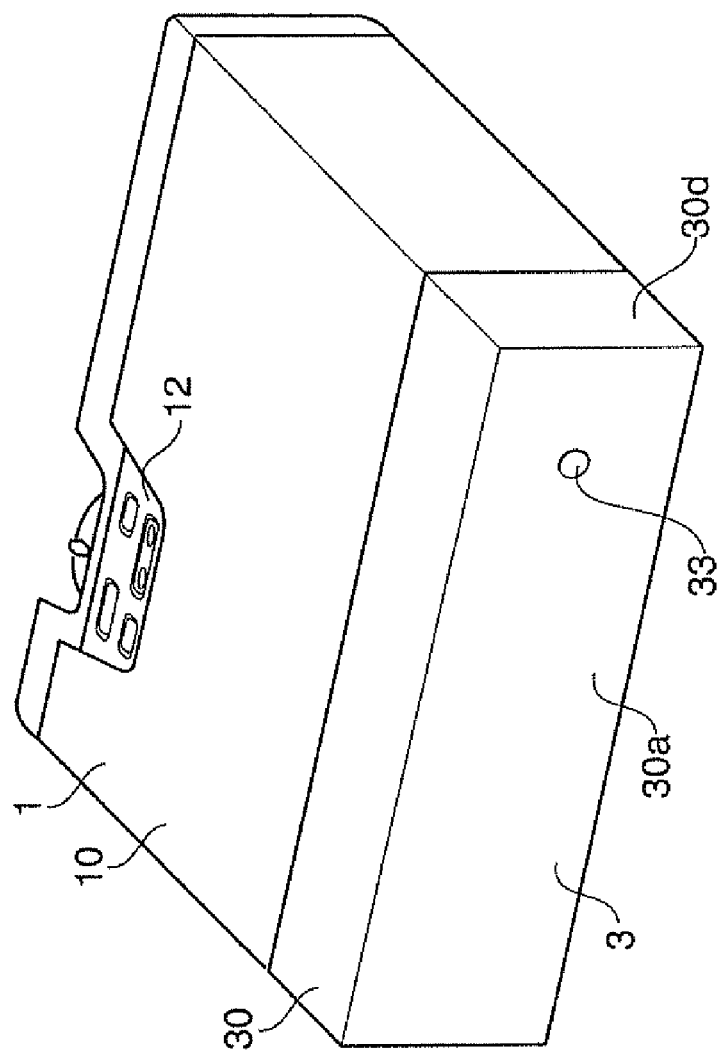
FIG. 7 is a perspective view of the projector with the projector housing cover according to a second embodiment attached thereto.

FIG. 7 is a perspective view of the projector with the projector housing cover according to the second embodiment attached thereto.

Figure 8:
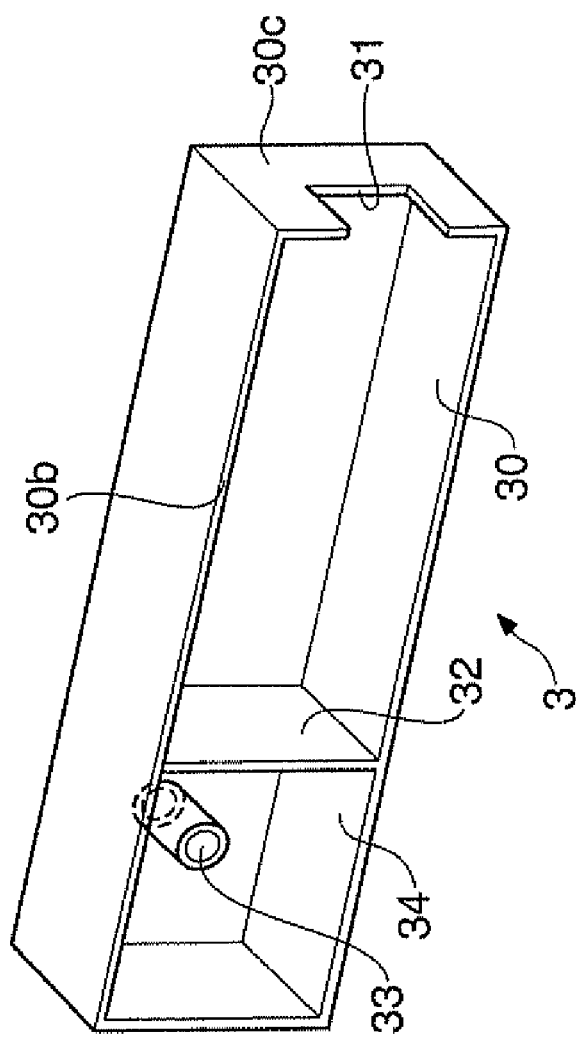
FIG. 8 is a perspective view of the projector housing cover viewed from the front side thereof.

FIG. 8 is a perspective view of a projector housing cover according to the second embodiment, viewed from the front side thereof.

Figure 9A:
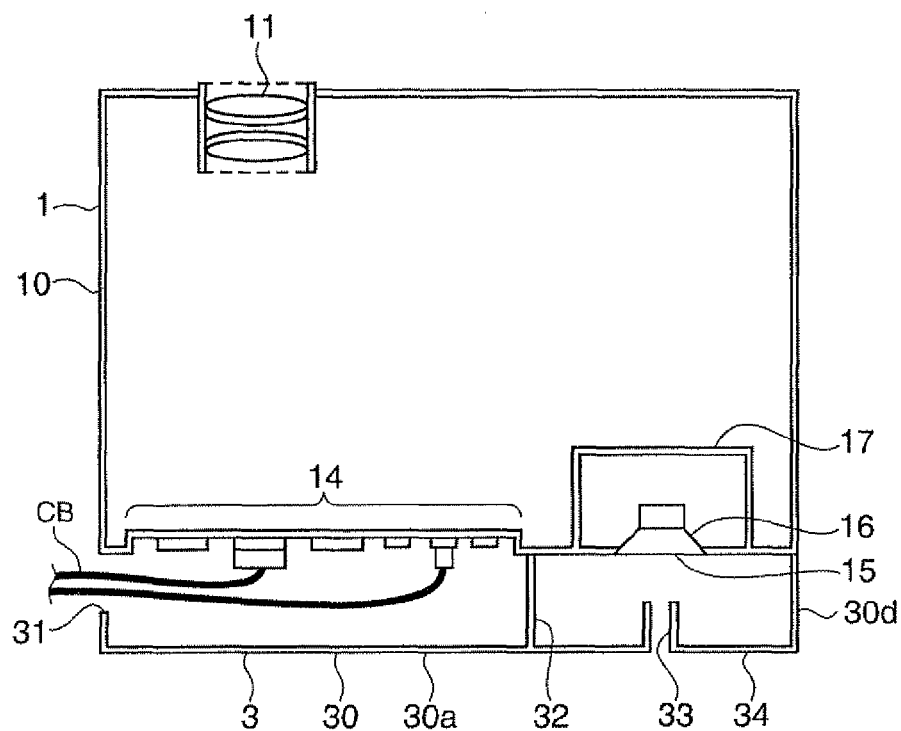
Figure 9B:
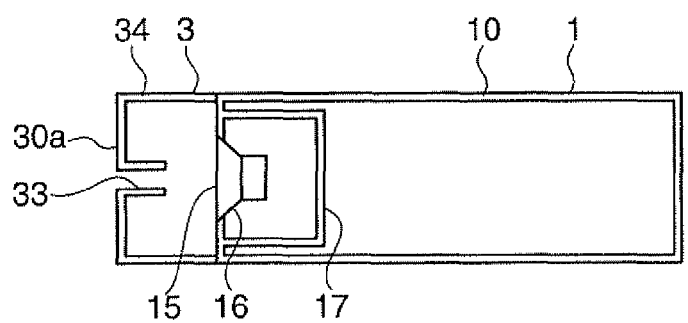

FIGS. 9A and 9B are cross-sectional diagrams of the projector with the projector housing cover according to the second embodiment attached thereto. FIG. 9A is the cross-sectional diagram thereof viewed from the upper side, and FIG. 9B is the cross-sectional diagram thereof viewed from a lateral side.

As shown in FIGS. 7, 8, 9A, and 9B, the projector housing cover 3 is provided with a cover main body 30 having an insertion passage section 31, and the partition plate 32 and the port 33 as the acoustic effect section, Similarly to the case of the first embodiment, the insertion passage section 31 forms an opening section allowing the connecting cables CB to be inserted therethrough when attaching the cover main body 30 to the housing 10 of the projector 1.

The partition plate 32 is a plate like member formed integrally with the cover main body 30, and is formed roughly parallel to the side face 30d of the cover main body 30, and roughly perpendicular to the rear face 30a thereof so as to form a box like space on the sound output side of the sound emission opening 15. The box like space is formed on the sound output side of the sound emission opening 15, thereby forming the Kelton type enclosure 34 surrounded with the rear face 30a, side face 30d, the top face, and the bottom face of the cover main body 30, the partition plate 32, and the housing 10. It should be noted that the material of the partition plate 32 is not limited to the same synthetic resin as that of the cover main body 30.

The port 33 is a duct formed integrally with the cover main body 30 and adapted to communicate the inside and the outside of the Kelton type enclosure 34 with each other. The port 33 is disposed on the surface of the rear face 30a of the Kelton type enclosure 34 so as to protrude roughly perpendicularly from the rear face 30a towards the front side 30b of the cover main body 30, and functions as a port for a sound output. It should be noted that although in FIGS. 7, 8, 9A, and 9B, the position at which the port 33 is formed is opposed to the center of the speaker device 16, the position is not limited thereto.

According to the configuration described above, when the projector housing cover 3 is attached to the housing 10 of the projector 1, and the sound signal is input to the connection terminal 14b from the external device such as a personal computer or a video reproducing device, the speaker device 16 of the projector 1 outputs the sound based on the sound signal, and the sound is output to the outside from the port 33 via the Kelton type enclosure 34.

According to the second embodiment described above, the following advantages can be obtained.

1. The projector housing cover 3 forms the Kelton type enclosure 34 provided with the port 33 as the acoustic effect section. Thus, when the projector housing cover 3 is attached to the housing 10 of the projector 1, it becomes possible to reinforce the low-frequency band of the sound output by the speaker device 16 as the acoustic effect processing. By thus reinforcing the low-frequency band of the sound, it is possible to output a powerful sound. Further, since the Kelton type enclosure 34 described above is effective for low range speakers, and is suitable for projectors equipped with the low range speaker.

2. Since the partition plate 32 and the port 33 are formed integrally with the cover main body 30 of the projector housing cover 3, no additional members are required, and it is possible to form the Kelton type enclosure 34 without increasing the number of components, thereby achieving reinforcement of the low-frequency band of the sound.

3. The partition plate 32 and the port 33 are formed integrally with the cover main body 30 of the projector housing cover 3, and therefore, does not disfigure the projector housing cover 3. In other words, in the case of attaching the projector housing cover 3 to the projector 1, the projector 1 is not disfigured as a whole.

Third Embodiment

Hereinafter, a third embodiment will be explained.

The projector housing cover according to the present embodiment is provided with a passive radiator forming a Kelton type enclosure with a passive radiator, instead of the port 33 of the projector housing cover 3 according to the second embodiment. The other constituents are the same as those of the second embodiment.

The projector housing cover will be explained with reference to FIGS. 10, 11, 12A, and 12B.

Figure 10:
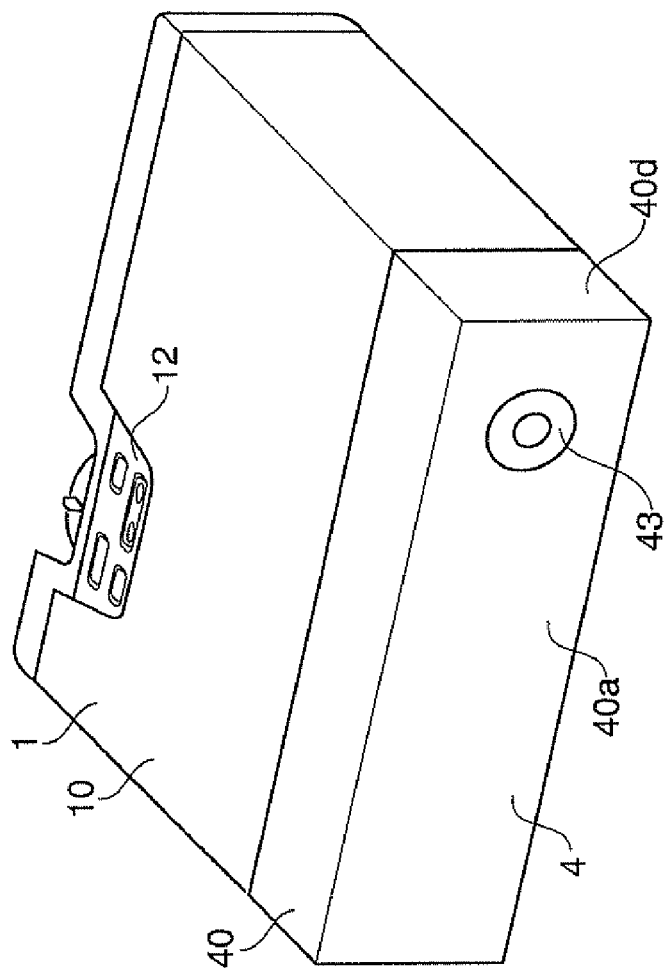
FIG. 10 is a perspective view of the projector with the projector housing cover according to a third embodiment attached thereto.

FIG. 10 is a perspective view of the projector with the projector housing cover according to the third embodiment attached thereto.

Figure 11:
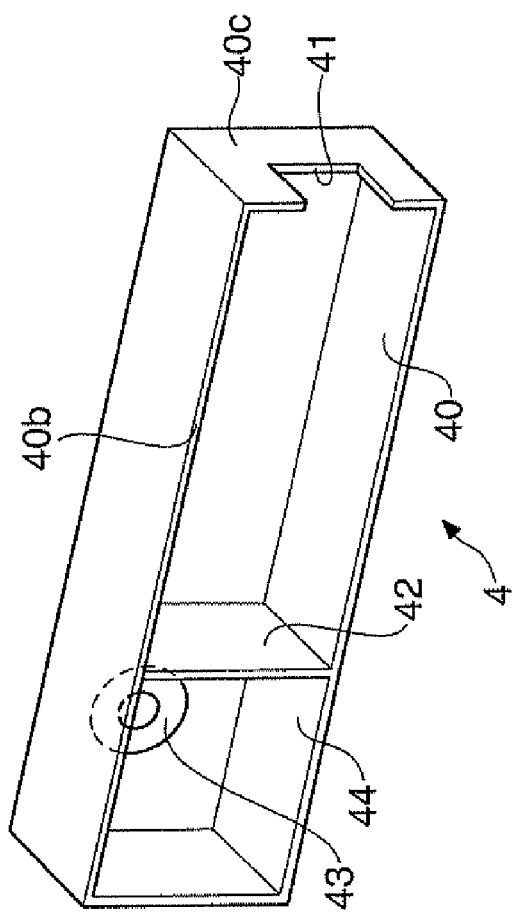
FIG. 11 is a perspective view of the projector housing cover viewed from the front side thereof.

FIG. 11 is a perspective view of a projector housing cover according to the third embodiment, viewed from the front side thereof.

Figure 12A:
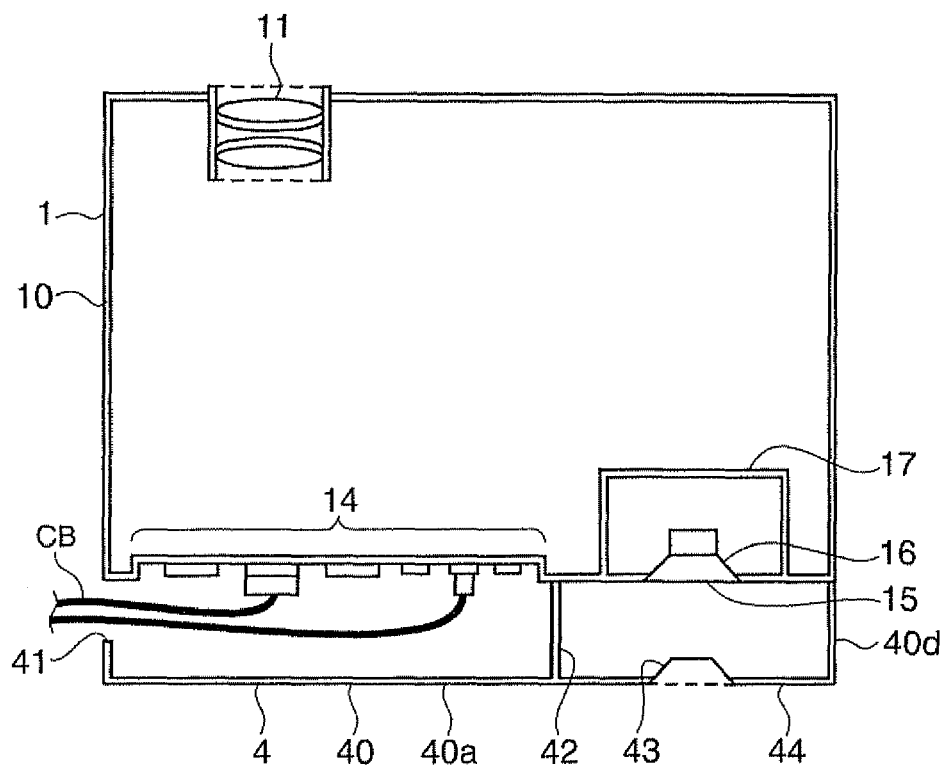
Figure 12B:
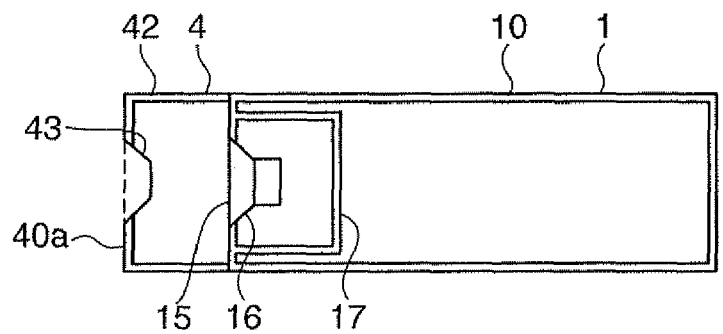

FIGS. 12A and 12B are cross-sectional diagrams of the projector with the projector housing cover according to the third embodiment attached thereto. FIG. 12A is the cross-sectional diagram thereof viewed from the upper side, and FIG. 12B is the cross-sectional diagram thereof viewed from a lateral side.

As shown in FIGS. 10, 11, 12A, and 12B, the projector housing cover 4 is provided with a cover main body 40 having an insertion passage section 41, and the partition plate 42 and the passive radiator 43 as the acoustic effect section.

Similarly to the second embodiment, the insertion passage section 41 forms an opening section allowing the connecting cables CB to be inserted therethrough. Further, similarly to the second embodiment, the partition plate 42 forms a box like space on the sound output side of the sound emission opening 15, thereby forming the Kelton type enclosure 44 surrounded with the rear face 40a, the side face 40d, the top face, and the bottom face of the cover main body 40, the partition plate 42, and the housing 10.

The passive radiator 43 is formed of a diaphragm such as a cone paper, and is disposed on the rear face 40a of the Kelton type enclosure 44. The passive radiator 43 vibrates in accordance with the acoustic output of the speaker device 16 to output the sound to the outside. It should be noted that although in FIGS. 10, 11, 12A, and 12B, the position at which the passive radiator 43 is formed is opposed to the center of the speaker device 16, the position is not limited thereto.

According to the configuration described above, when the projector housing cover 4 is attached to the housing 10 of the projector 1, and the sound signal is input to the connection terminal 14b from the external device such as a personal computer or a video reproducing device, the speaker device 16 of the projector 1 outputs the sound based on the sound signal, and the sound is output to the outside from the passive radiator 43 via the Kelton type enclosure 44.

According to the third embodiment described above, the following advantage can be obtained.

The projector housing cover 4 forms the Kelton type enclosure 44 provided with the passive radiator 43 as the acoustic effect section. Thus, when the cover main body 40 is attached to the housing 10 of the projector 1, it becomes possible to reinforce the low-frequency band of the sound output by the speaker device 16 as the acoustic effect processing. By thus reinforcing the low-frequency band of the sound, it is possible to output a powerful sound. Further, since the Kelton type enclosure 44 described above is effective for low range speakers, and is suitable for projectors equipped with the low range speaker.

It should be noted that the embodiments describe above are not limitations, but it is possible to put the embodiments into practice added with various modifications or improvements. Some modified examples will be described below.

MODIFIED EXAMPLE 1

Figure 13A:
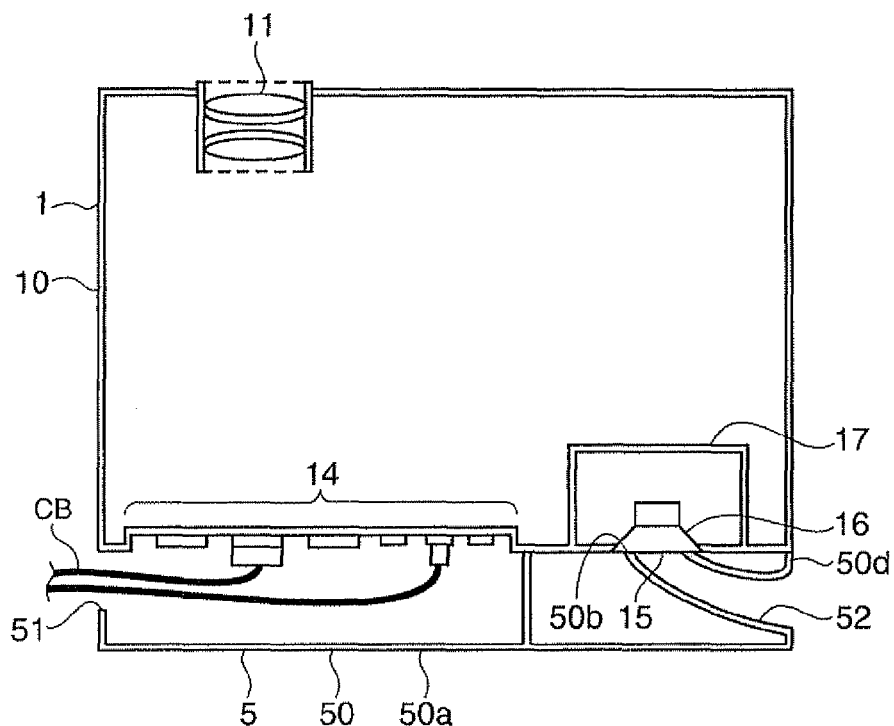
Figure 13B:
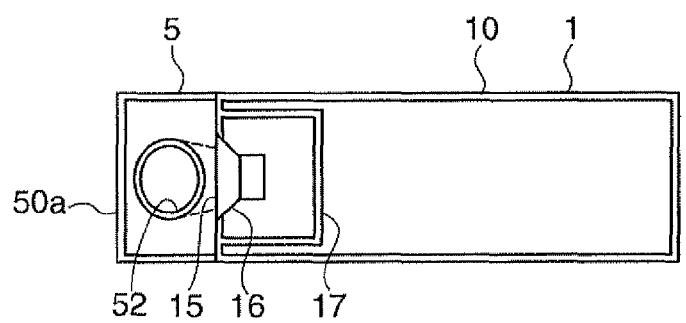

Although in the first embodiment described above, the front loaded horn 22 is assumed to have the opening on the rear face 20a of the cover main body 20a, it is also possible to arranged that the opening is disposed on the side face as shown in FIGS. 13A and 13B.

FIGS. 13A and 13B are cross-sectional diagrams of the projector with the projector housing cover according to the present modified example attached thereto. FIG. 13A is the cross-sectional diagram thereof viewed from the upper side, and FIG. 13B is the cross-sectional diagram thereof viewed from a lateral side.

The front loaded horn 52 has a shape having the opening area thereof at a position between the front face 50b and the side face 50d of the cover main body 50 gradually increasing as the position moves from the front face 50b towards the side face 50d. By adopting such a configuration, since the opening section of the front loaded horn 52 does not exist on the rear face 50a, the projector 1 viewed from the rear side is not disfigured even in the case of attaching the projector housing cover 5 to the projector 1.

MODIFIED EXAMPLE 2

Although in the second and the third embodiments, the port 33 and the passive radiator 34 are assumed to be disposed on the rear face of the Kelton type enclosure, respectively, it is also possible to arrange that the port 33 and the passive radiator 34 are disposed on other faces (e.g., the side face, the top face, or the bottom face) than the rear face.

MODIFIED EXAMPLE 3

Although in the embodiments described above, the cove main body and the housing 10 of the projector 1 are assumed to fixed to each other with screws not shown, the fixing measure is not limited to the screws. Further, it is also possible to arrange that a packing or the like is inserted between the cover main body and the housing 10 when fixing the cover main body and the housing 10 of the projector 1 to each other. Thus, the airtightness of the front loaded horn 22, or the Kelton type enclosures 34, 44 can be improved, thereby further suppressing the lowering of the sound pressure and degradation in the sound quality.

MODIFIED EXAMPLE 4

Although the projector 1 of the embodiments described above uses the transmissive liquid crystal light valve 62 as the light modulation device, it is also possible to use a reflective light modulation device such as a reflective liquid crystal light valve. Further, a micromirror array device for modulating the light emitted from the light source by controlling the emission direction of the incident light of every micromirror as a pixel can also be used.

The entire disclosure of Japanese Patent Application Nos. 2007-335955, filed Dec. 27, 2007 is expressly incorporated by reference herein.

What is claimed is:

1. A projector housing cover adapted to be attached to a housing of a projector having a connection terminal to be connected to an external apparatus via a connecting cable, and a speaker device adapted to output a sound through a sound emission opening, and cover the connection terminal and the speaker device, comprising:
   a cover main body having a box like shape, having an opening on a face opposed to the housing, and having an insertion passage section through which the connecting cable is inserted; and
   an acoustic effect section integrally formed with and protruding from the cover main body, and adapted to execute an acoustic effect processing on a sound output from the speaker device, the acoustic effect section is disposed at a position facing the sound emission opening and protruding from the cover main body in a direction toward the sound emission opening.

2. The projector housing cover according to claim 1, wherein
   the acoustic effect section is provided with a front loaded horn.

3. The projector housing cover according to claim 2, wherein the acoustic effect section contacts the sound emission opening.

4. The projector housing cover according to claim 1, wherein
   the acoustic effect section forms a Kelton type enclosure having a port.

5. The projector housing cover according to claim 1, wherein
   the acoustic effect section forms a Kelton type enclosure having a passive radiator.

6. A projector, comprising:
   a projector main body covered by a housing; and
   the projector housing cover according to claim 1.

7. A projector comprising:
   a light source;
   a light modulation device adapted to modulate light emitted from the light source to form an optical image;
   a projection optical system adapted to project the optical image formed by the light modulation device;
   a housing adapted to house the light source, the light modulation device, and the light projection optical system; and
   the projector housing cover according to claim 1.

* * * * *